(No Model.)
G. HARGREAVES, E. W. PORTER & J. P. SCRANTON.
CARBURETOR.
No. 432,270. Patented July 15, 1890.
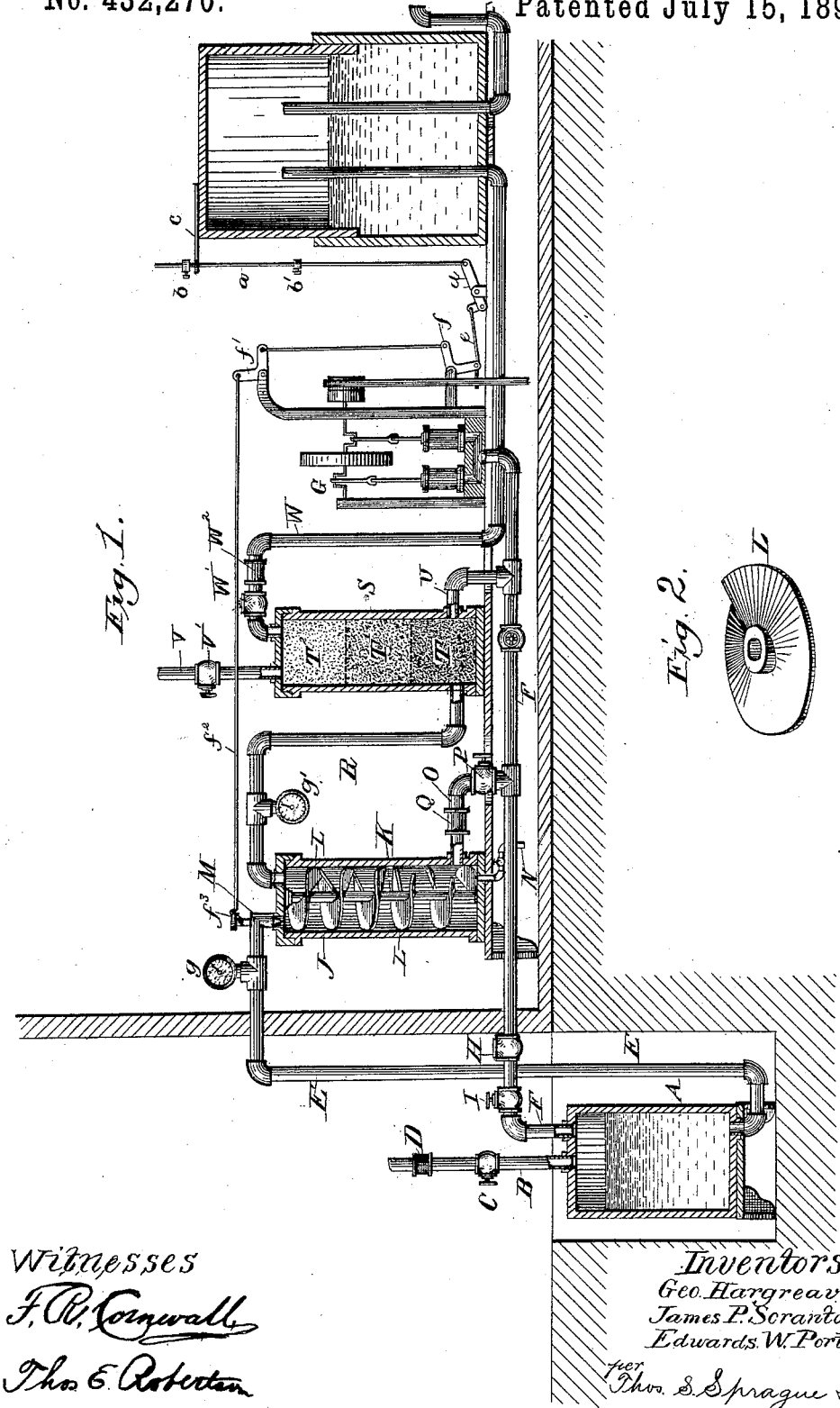
Witnesses
F. R. Cornwall
Thos. E. Robertson
Inventors:
Geo. Hargreaves,
James P. Scranton,
Edwards. W. Porter.
per Thos. S. Sprague & Son.
Their Atty's.

UNITED STATES PATENT OFFICE.

GEORGE HARGREAVES, EDWARDS W. PORTER, AND JAMES P. SCRANTON, OF DETROIT, MICHIGAN.

CARBURETOR.

SPECIFICATION forming part of Letters Patent No. 432,270, dated July 15, 1890.

Application filed September 23, 1889. Serial No. 324,777. (No model.)

*To all whom it may concern:*

Be it known that we, GEORGE HARGREAVES, EDWARDS W. PORTER, and JAMES P. SCRANTON, citizens of the United States, residing at Detroit, in the county of Wayne and State of Michigan, have invented certain new and useful Improvements in Carburetors, of which the following is a specification, reference being had therein to the accompanying drawings.

This invention relates to new and useful improvements in apparatus for carbureting air; and the invention consists in the peculiar construction and arrangement of the parts, whereby all loss from the evaporation of the gasoline in the storage-tank is avoided; whereby, further, every drop of the gasoline or other hydrocarbon is converted into gas without leaving a residuum, and whereby, further, the whole apparatus is of very simple construction, easily manipulated, and operates automatically, all as more fully hereinafter described, and shown in the accompanying drawings, in which—

Figure 1 is a diagram elevation of our apparatus, partially in section, showing the construction, arrangement, and operation of the parts. Fig. 2 is a detail showing the construction of the carburetor, as more specifically hereinafter referred to.

A is a closed storage-tank for containing a suitable quantity of hydrocarbon, which is introduced through a suitable fill-opening, preferably a pipe B, entering the top of the tank, on which are a valve C and a suitable coupling D, by means of which connection may be made with the tank-car, pipe-line, or other source of supply from which the gasoline is procured. Where circumstances permit, this storage-tank is preferably placed underground, in a suitable cellar or vault, a suitable distance away from the apparatus. Two pipes E and F connect with the storage-tank, the former into the bottom and the other into the top of the tank. The pipe F connects the air-pumps G with the storage-tank, for the purpose of charging the top of the tank with compressed air, for two purposes: first, to prevent loss from evaporation by preventing the free contact of the gasoline with the outer air, and, second, for the purpose of elevating the gasoline in the feed-pipe E. A check-valve H is placed in the pipe F, to prevent the air-pressure in the tank from escaping back through the pipe F, and an ordinary valve I is also preferably placed in the same pipe between the check-valve and the tank, for ordinary contingencies.

J is the carburetor, which is placed above the level of the oil-tank, and consists, substantially, of a cylindrical vessel provided with a detachable head and a support K, secured in the axis thereof, and upon which are sleeved a vertical series of spirally-inclined planes L, as shown in detail in Fig. 2. These spirals are preferably made of metal, and each forms just one turn. In arranging them upon the support K the spirals do not form a continuous pathway, but each is turned back about one-quarter of a revolution to the one next above it, and the edges of the spirals extend into contact with the walls of the vessel J. The feed-pipe E enters the top of the vessel J, and is provided at or near its discharge end with a so-called "needle-valve" M, with one or more openings for discharging the oil, or other suitable valve for regulating the flow of the oil into the top of the vessel. The bottom of the vessel J is provided with a waste-pipe N, controlled by a suitable valve, and a connection O with the air-feeding pipe F, in which connection there are placed an ordinary valve P and a pressure-valve Q, which may be set to open at a fixed pressure.

A pipe R leads from the top of the carburetor into the bottom of another vessel S, which constitutes the filter or purifier, and in which there are different layers of purifying material T T' T'', &c., separated by perforated diaphragms. The materials used for filtering or purifying may be of the well-known kind, such as iron sponge at the bottom, animal or wood charcoal for the next layer, and then kaolin or other absorbent, &c. This purifying-tank has a connection U, controlled by a suitable valve, with the air-feeding pipe F. A pipe V, controlled by a suitable valve V', leads from the top of this purifier into the atmosphere, and a pipe W, controlled by a valve W' and having a check-valve W'', leads from the top of the purifier into the gasometer, which is constructed and arranged in the usual manner, and which is arranged to automatically control the apparatus in the following manner: A vertical rod $a$ is risingly and fallingly secured in suitable bearings in proximity to the gasometer, and two stops $b$ and $b'$ are adjustably secured upon this rod. An arm $c$ projects from the gasometer and slidingly engages upon the rod $a$. The lower end of this rod $a$ pivotally connects to one end of a lever $d$. E is a belt-shifting rod, which is slidingly actuated by its engagement with the lever $d$ to shift the driving-belt of the air-pump from the loose onto the fast pulley, and vice versa. One arm of the bell-crank $f$ engages with this belt-shifting rod, and the other arm is connected to the bell-crank $f'$, which has a suitable adjustable connection $f''$ with the handle $f^3$ of the valve M.

In practice, the parts being constructed and arranged as shown and described, they are intended to operate as follows: Upon motion being given to the air-pump the air is forced first into the storage-tank A on top of the hydrocarbon contained therein, and the result is that the pressure of said air forces the oil up into the pipe E and through the valve M, which is open to a certain degree, and feeds the oil into the top of the carburetor. As soon as the pressure of the air in the air-feeding pipe F rises above the point at which the valve Q is adjusted, the air will flow through the connection O into the bottom of the carburetor, and, passing between the spirals L in an upward direction, is brought into contact with the oil fed into the top of the carburetor, and is thereby highly carbureted by the time it rises to the top of the carburetor J, from whence it is then carried through the pipe R into the bottom of the purifier, and from there it is conducted into the gas-holder.

The operation of the carburetor is novel in different ways. First, it will be seen that the oil is fed through the valve M and drips upon the uppermost of the spirals L, and following the incline of the spiral it drips off the edge into the next lower spiral after running about three-quarters of a turn, and so on. It will be seen that the oil is thus spread in a thin sheet by flowing from the surface of the spirals, and again falls from one spiral to the other through the air against the upward current of the air passing up from the bottom of the carburetor, so that the current of air can catch it and spread it on the under side of the spiral disks, where it is much more effectually vaporized than on top. Thus the air and oil are brought into very intimate contact with each other over a very extended path, and if the feed is properly regulated all the oil will have been vaporized by the air without leaving a residuum. As the valve Q in the connection $Q'$ is loaded to a certain pressure, the air will be discharged into the carburetor at the pressure at which the valve Q is adjusted, and this pressure is practically maintained within the carburetor, and as a result thereof the flow of the oil in a downward direction is opposed by the current of air as it drips from one spiral into the next one below, is caught and diffused, and thus more readily vaporized. It is obvious that the air, being compressed or dense, is able to carry the heavier as well as the lighter hydrocarbons, and consequently all the oil will be evaporated. As the feed through the valve M has to overcome the pressure of the air in the carburetor, the valve Q has to be set so that the pressure opposing the discharge of the oil through the valve M is less than the pressure back of the oil. To facilitate a proper adjustment in this respect, we place a pressure-gage $g$ near the valve M, and a similar pressure-gage $g'$ to communicate with the top of the carburetor by placing it preferably into the pipe R at or near the carburetor. By observing the two pressure-gages the valve Q is then adjusted at such a pressure that the pressure-gage $g'$ indicates a lesser pressure than the pressure-gage $g$. The carbureted air, after passing through the purifying-tank, escapes into the gas-holder, and as this gas-holder becomes filled the arm $c$ engages with the stop $b$, and thereby lifts up the rod $a$. This actuates the belt-shifting device and carries the belt on the pump from the fast onto the loose pulley. At the same time the rod $f^2$ to the handle of the valve M will be actuated by its described connection with the belt-shifting device to close the valve M, and thus shut off the oil. Thus the further production of gas is stopped until the holder becomes nearly empty, when the arm $c$ will strike the lower stop $b'$ on the rod $a$, and thereby actuate the belt-shifting device to set the pump in motion, while at the same time the oil is turned on and the gas-making is proceeded with until the gas-holder becomes again filled to a point regulated by the stops. It will be observed that the pressure of the air always remains upon the top of the gasoline in the storage-tank, whether in or out of operation, and, beyond what quantity of air is inclosed, there is no fresh air allowed to come into contact with the oil, and as a consequence the oil in the tank is not deteriorated, nor can any loss from evaporation occur.

The connection U of the purifier with the air-feeding device F is for the purpose of restoring the materials in the purifier after they have lost their purifying action by closing the valves which connect it with the carburetor and the gas-holder, respectively, and opening the valves in the connection U with the air-pipe and in the escape-pipe V. By allowing the air thus to blow through the purifier the material may be restored or revived to original purity, to be used again. The action of the material in the purifier is, first, to more thoroughly mix the air with the vapors and absorb the non-vaporized particles of hydrocarbon; second, the iron sponge, which consists of oxide of iron, removes sulphur compounds; third, the animal or wood charcoal acts as a deodorizer; fourth, the kaolin absorbs more particularly the sulphureted carbon, if present, which if allowed to remain would create more or less smoke in burning the gas.

While we preferably use the construction of apparatus shown, obvious modifications may be made without changing our invention. Thus, for instance, more than one feed-pipe may be used to feed oil into the carburetor; or, instead of the spiral pathway, a series of inclined planes may be formed in the carburetor over which the oil has to flow; or the diffusing or spraying of the oil may be effected by discharging air in a jet against the oil as it drips from the discharge-nozzle into the carburetor.

What we claim as our invention is—

1. In an apparatus for manufacturing gas, the combination, with a storage-tank and air-compressor, of a carburetor and filter, both having direct communication with the compressor, a pipe leading from the storage-tank into the top of the carburetor, a pipe leading from the carburetor into the filter, a communicating pipe between the tank and compressor, and regulating-valves in the several pipes, substantially as described.

2. The combination, with the carbureting-chamber and its oil and air feed connections into the top and bottom of said chamber, respectively, of an interrupted spiral pathway formed therein by means of a vertical series of separated spiral disks, each disk projecting with its lower edge over the upper edge of the disk below it, substantially as described.

3. In an apparatus for manufacturing carbureted air, the combination of the air-compressor, the main air-feed pipe, the carburetor having an air-feed connection with the main air-feed pipe, the storage-tank arranged below the carburetor, the oil-feed connection from the bottom of said tank into the carburetor, a connection between the top of the tank and main air-pipe, a check-valve in said connection, and a differential regulating pressure-valve in the air-feed connection between the carburetor and main air-feed for maintaining a constant and high air-pressure on the tank and a diminished pressure in the carburetor, substantially as described.

4. In an apparatus for manufacturing carbureted air, the same consisting of a carburetor, a storage-tank from which the hydrocarbon oil is automatically fed into the carburetor in small quantities regulated by a feed-valve, an air-compressor, a feed-pipe, and connections with the storage-tank and the carburetor, a check-valve in the air-feed connection with the storage-tank, a pressure-valve in the air-feed connection with the carburetor, a purifier, a valve-controlled connection between said purifier and the air-feed pipe, and an exhaust-pipe from said purifier, all arranged to operate substantially as described.

5. In an apparatus for manufacturing carbureted air, the combination of a regulating-valve in the oil-feed pipe, a belt-shifting device in the actuating mechanism of the air-pump, and a single controlling mechanism for both, the same consisting of a rising and falling rod actuated by the movement of the gasometer, and a lever and intermediate mechanism operated by said rod, substantially as described.

In testimony whereof we affix our signatures, in presence of two witnesses, this 14th day of August, 1889.

GEORGE HARGREAVES.
EDWARDS W. PORTER.
JAMES P. SCRANTON.

Witnesses:
A. HAMILTON,
ED MCBREARTY.